May 27, 1952  J. L. DAVIS  2,598,363
BONDING APPARATUS
Filed Aug. 24, 1950  2 SHEETS—SHEET 1
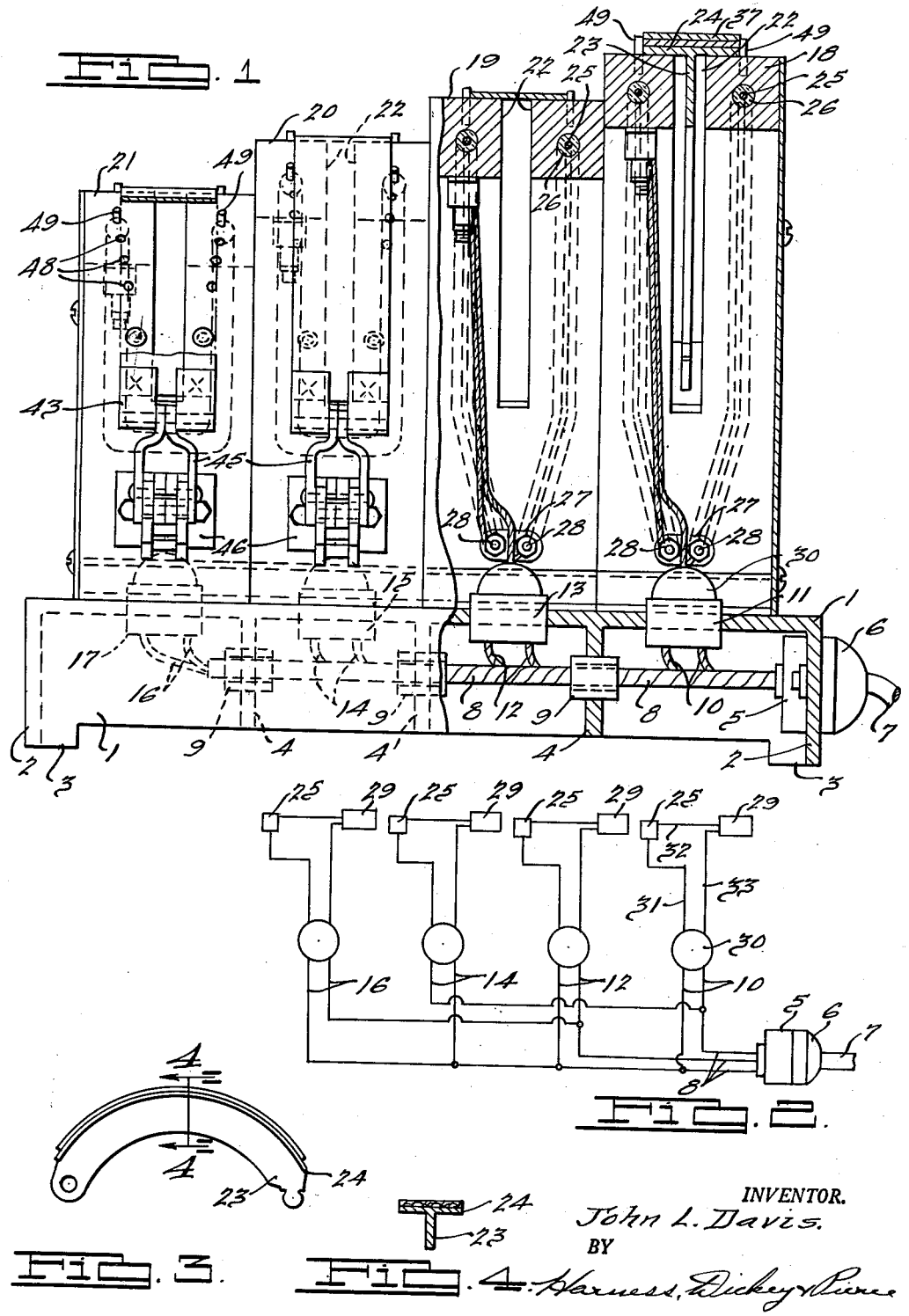
INVENTOR.
John L. Davis.
BY
Harness, Dickey & Pierce
ATTORNEYS.

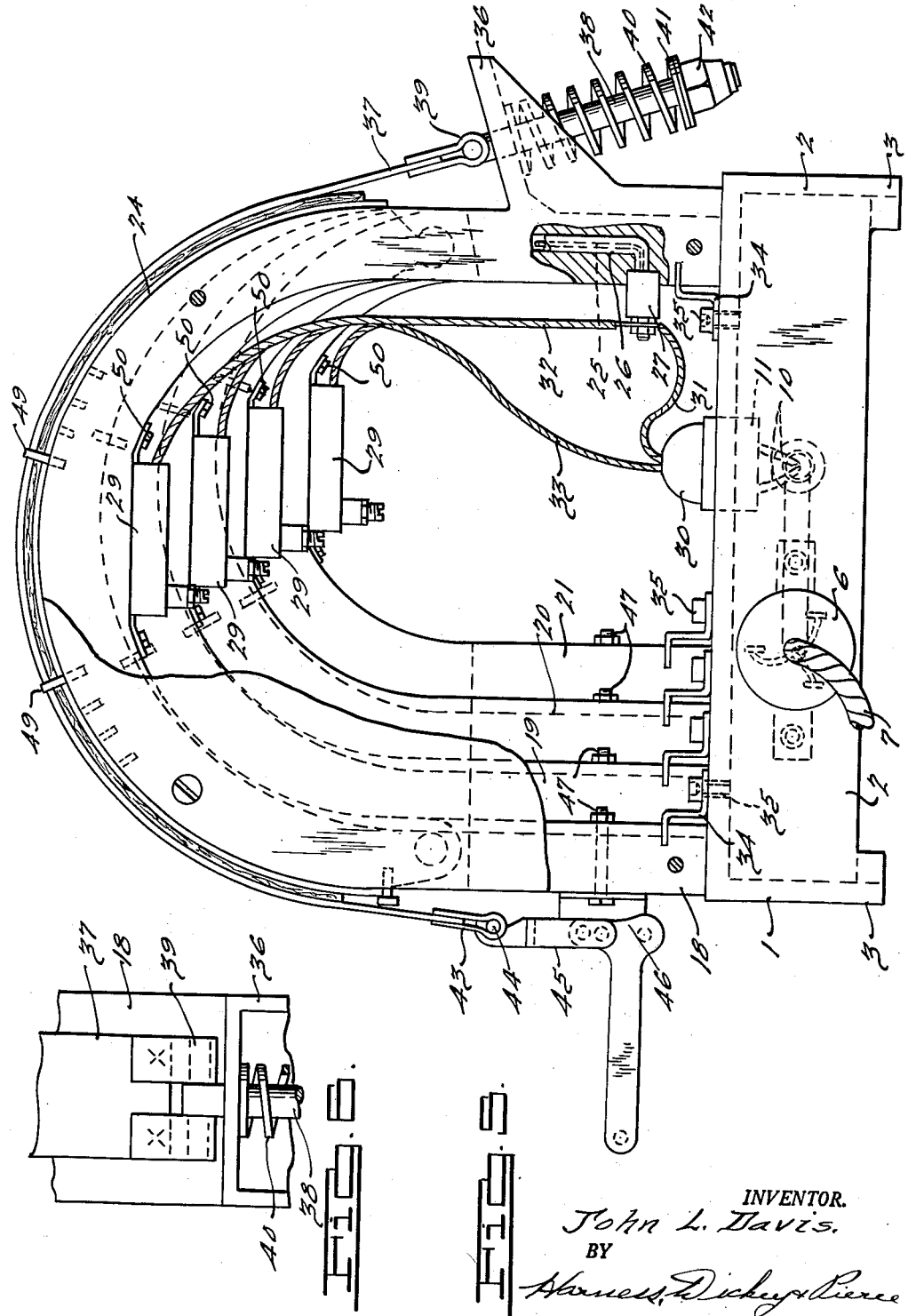

Patented May 27, 1952

2,598,363

UNITED STATES PATENT OFFICE 2,598,363

BONDING APPARATUS

John L. Davis, Ann Arbor, Mich.

Application August 24, 1950, Serial No. 181,162

4 Claims. (Cl. 154—1)

This invention relates generally to bonding apparatus and more particularly to a novel and improved bonding machine primarily designed and intended for bonding brake linings to brake shoes of the general type in common use in the automotive industry.

A primary object of the present invention is to provide a brake bonding machine which is compact, efficient, and easily and simply operated.

Another object of the present invention consists in the provision of a machine which can, if desired, be used for bonding shoes of substantially all sizes and shapes now in common use, that is shoes of nine, ten, eleven and twelve inch diameters.

Still further, the present invention contemplates the provision of a brake bonding machine in which a universal base is provided on which universal base a plurality of brake shoe supporting anvils may be detachably mounted in order that each individual anvil may be easily and quickly removed and replaced without disturbing in any way the mounting of the other anvils, thus providing a construction whereby any desired combination of anvil sizes may be made available all mounted together on a single base.

Many other and further objects, advantages and features of the present invention will become clearly apparent from a consideration of the following specification together with the accompanying drawings forming a part thereof.

In the drawings:

Figure 1 is a front elevational view with parts broken away and parts in section illustrating one embodiment of my improved brake shoe bonding machine;

Figure 2 is a circuit diagram showing the wiring circuit for the machine shown in Figure 1;

Figure 3 is a side elevational view of a brake shoe of the general type which the machine of the present invention is designed to process;

Figure 4 is a cross-sectional view taken along the line 4—4 of Figure 3 showing the cross-sectional configuration of the shoe;

Figure 5 is an end elevational view of the machine shown in Figure 1 with parts broken away and parts in section in order to more clearly illustrate the interior construction and arrangement of parts;

Figure 6 is an enlarged fragmentary elevational view of the anchored end of the clamping strap on one of the units.

With more particular reference to the drawings it will be clearly understood that but one single embodiment of my invention is illustrated in the drawings and described below. However, numerous other embodiments as well as modifications of the construction shown may be made without departing from the general spirit and scope of my invention as defined in the subjoined claims.

The machine shown comprises a universal mounting base 1 which is generally rectangular in shape, having a generally flat or plane upper surface with depending side walls 2 at all four sides thereof. This base may be fabricated from any suitable material but it has been found most satisfactory to fabricate it from a single integral aluminum casting, thus providing a supporting base which is not only light and strong but extremely rigid. At each of the corners the side walls 2 may be extended downwardly to form legs 3, thus providing ventilation for the interior of the base.

Interiorly the base is preferably provided with three transversely extending integrally formed ribs 4 which not only serve to strengthen and make the base structure more rigid, but also serve to provide support for portions of the wiring as hereinafter described in detail.

Mounted in one of the end walls of the base is a conventional electrical receptacle 5 adapted to receive a conventional 220 volt plug 6 connected to a flexible electrical cable 7, the other end of which may be plugged into a suitable electric outlet (not shown).

From the receptacle 5 a cable 8 runs longitudinally generally through the central portion of the base and supported by the downwardly extending ribs 4 described above.

As is conventional in constructions of this general character, at each point where the cable 8 passes through one of the ribs 4 it is surrounded by a suitable ceramic insulator 9 to support the cable entirely out of contact with the base. A pair of branch leads 10 serve to connect the cable 8 with an electrical receptacle 11 mounted in the upper surface of the base. Similarly, a pair of leads 12 supply current to a receptacle 13, a pair of leads 14 supply current to a third receptacle 15 and a pair of leads 16 supply current to a receptacle 17. It will therefore be seen that the cable 8 serves to supply electric current to four receptacles 11, 13, 15 and 17, arranged in a row in equally spaced relation in the central portion of the base.

In the construction shown the apparatus comprises four anvils 18, 19, 20 and 21, and in the particular machine illustrated each of these anvils is designed to receive and support a shoe of a different size. Except for the difference in size, all four of the anvils are substantially identical in construction. Each anvil is of generally inverted U-shape and the upper surface is formed on an arc of curvature of the brake shoe it is adapted to receive. Each anvil has a slot 22, formed therein to receive the web 23 of the brake shoe 24 to be bonded.

The anvils are preferably formed of cast aluminum and have the heating elements cast therein at the time the anvils are cast in order to provide a unitary and rugged construction. These heating elements 25 are formed of a suitable electrical resistance alloy which is wrapped in glass wool insulating material 26. These heating elements thus insulated are placed in the mold at the time the anvil is cast and the glass wool fuses to form a completely insulated heating element embedded within the casting. The outer ends of the heating elements which project from the interior surface of the casting are surrounded by ceramic nipples 27 which serve to provide a pair of terminals 28 in each anvil.

More or less conventional thermostat units 29 are anchored by screws 50 in intimate contact with the underside of the working surface of each anvil. Each anvil has an electrical plug for supplying current thereto, the plug 30 as is seen in Figures 1 and 5 being plugged into the receptacle 11 and serving to supply current to the anvil 18. One wire 31 from the plug 30 is connected to one of the terminals 28 which constitutes one end of the heating element in the anvil 18. A wire 32 connects the terminal 28 constituting the other end of the heating element with the thermostat 29 which is anchored to the anvil 18. A wire 33 connects the second terminal of the plug 30 with the second terminal of the thermostat 29.

Each of the anvils is removably anchored to the base by means of a pair of brackets 34 held in position by means of cap screws 35 which serve to hold the anvil in rigid position on the base.

Each of the anvils is provided with an integrally formed outwardly projecting lug 36 which serves to provide means for anchoring one end of the clamping strap 37. A T-bolt 38 has the head thereof engaged by a pair of loops 39 formed on the end of the strap 37. This T-bolt 38 extends through a suitable aperture in the lug 36 and is surrounded by a suitable compression coil spring 40, one end of which engages the underside of the lug 36 and the other end of which engages a washer 41 held in position by a nut 42 threaded on the T-bolt.

The opposite end of the strap 37 is likewise provided with a pair of loops 43 similar to the loops 39 described above. The strap 37 may be formed of any suitable material but is preferably formed of stainless steel with the loops formed of separate portions welded thereto. The loops 43 serve to support a transversely extending pin 44 which is adapted to be releasably engaged by the hooked end of a toggle bar 45 of a toggle clamp 46. The toggle clamp 46 is bolted to the exterior of the anvil 18 by means of bolts 47, and it will of course be understood the similar toggle clamps functioning in precisely the same way are bolted to each of the other anvils.

It will be seen from the foregoing that when it is desired to replace one of the anvils it is merely necessary to unbolt the pair of brackets 34 which retain the anvil in position and unplug the plug 30 from its receptacle and the entire anvil may be removed and just as simply replaced. Likewise it will be seen that if desired the machine can be assembled with four anvils, each of a different size as shown, or it can be very simply and easily modified to have all the anvils the same size or any other desired permutation or combination.

In operation of the device the hook on the end of the toggle bar 45 is unhooked from the pin 44 thereby releasing the end of the strap 37 so that it may be moved entirely out of the way. The brake shoe to be relined is then dropped into position on the anvil with the web 23 thereof in the slot 22 of the anvil. The outer peripheral surface of the brake shoe must, of course, be first thoroughly cleaned as is conventional. A segment of brake lining which has previously had its inner surface coated with a suitable thermosetting plastic material is then placed in position on the surface of the shoe.

As is seen in Figure 1 of the drawings, each anvil is provided with a series of drilled holes 48 arranged in pairs. These holes are adapted to receive a pair of dowel pins 49. By selecting the proper pair of holes in which to insert the dowel pins it will be seen that these pins will serve not only to locate the brake shoe precisely in position, but also to locate the coated lining in the proper position on the brake shoe. After the lining has thus been properly mounted in position on the brake shoe the clamping strap is swung over into the position shown in Figure 5 and the toggle clamp actuated to clamp the parts firmly together. The thermostat serves to maintain the anvil within the proper temperature range and it is therefore only necessary to maintain the parts thus clamped together for a predetermined interval of time in order to obtain a proper bond.

It will be readily appreciated that the specific embodiment of the invention described in detail above is susceptible of many and various modifications without departing from the spirit of my invention as defined in the following claims.

What is claimed is:

1. A machine for bonding brake shoes to brake linings comprising a supporting base member having at least one electrical outlet in the upper surface thereof, at least one metallic brake shoe supporting anvil releasably mounted on said base member, each anvil being of arcuate form and having an arcuate exterior surface adapted to receive the brake shoe to be relined, each anvil having a slot extending inwardly from said arcuate surface to receive the web of the brake shoe, insulated heating elements disposed adjacent said arcuate surface on opposing sides of said slot and completely encased by the metal of each anvil, releasable means for electrically connecting the heating elements of each anvil with the respective electrical outlet in the base, means mounted on each anvil for maintaining a brake shoe in assembled relation to a segment of lining, clamping means including a flexible metallic clamping strap resiliently anchored to each anvil at one end and adapted to overlie the brake shoe and lining thereon and urge the same into intimate engagement with each other and with their respective anvil, toggle means mounted on each anvil and engageable with the free end of the strap on each anvil to releasably hold the same during bonding, and a thermostat carried by each anvil and in circuit with the heating elements thereof for controlling the temperature.

2. A machine for bonding brake shoes to brake linings comprising a supporting base member having at least one electrical outlet in the upper surface thereof, at least one metallic brake shoe supporting anvil releasably mounted on said base member, each anvil being of arcuate form and having an arcuate exterior surface adapted to receive the brake shoe to be relined, each anvil having a slot extending inwardly from said arcuate surface to receive the web of the brake shoe, heating elements disposed adjacent said arcuate surface on opposite sides of said slot and completely encased by the metal of each anvil, releasable means for electrically connecting the heating elements of each anvil with the respective electrical outlet in the base, each anvil having a plurality of unequally spaced pairs of holes formed therein, dowel pins positionable in pairs in said holes to maintain the brake shoe in position on the anvil and the lining in proper relation to the brake shoe, clamping means including a flexible metallic clamping strap resiliently anchored to each anvil at one end and adapted to overlie the brake shoe and lining thereon and urge the same into intimate engagement with each other and with their respective anvil, toggle means mounted on each anvil and engageable with the free end of the strap on each anvil to releasably hold the same during bonding, and a thermostat carried by each anvil and in circuit with the heating elements thereof for controlling the temperature.

3. A machine for bonding brake shoes to brake linings comprising a supporting base member having at least one electrical outlet in the upper surface thereof, at least one metallic brake shoe supporting anvil releasably mounted on said base member, each anvil being of arcuate form and having an arcuate exterior surface adapted to receive the brake shoe to be relined, each anvil having a slot extending inwardly from said arcuate surface to receive the web of the brake shoe, insulated heating elements disposed adjacent said arcuate surface on opposing sides of said slot and completely encased by the metal of each anvil, releasable means for electrically connecting the heating elements of each anvil with the respective electrical outlet in the base, means mounted on each anvil for maintaining a brake shoe in assembled relation to a segment of lining, clamping means including a flexible metallic clamping strap resiliently anchored to each anvil at one end and adapted to overlie the brake shoe and lining thereon and urge the same into intimate engagement with each other and with their respective anvil, toggle means mounted on each anvil and engageable with the free end of the strap on each anvil to releasably hold the same during bonding, and a thermostat carried by each anvil and in circuit with the heating elements thereof for controlling the temperature, the insulation for the heating elements comprising glass wool insulating material wrapped about the heating elements prior to pouring of metal for the anvil so that the subsequently poured metal fuses the glass wool about the heating elements, the glass insulation providing an electrical insulator having high heat conductivity.

4. A machine for bonding brake linings to brake shoes comprising a supporting base member having a plurality of electrical outlets in the upper surface thereof, a plurality of interchangeable metallic brake shoe supporting anvils releasably mounted on said base member, each anvil being of arcuate form and having an arcuate exterior surface adapted to receive the brake shoe to be relined, each anvil having a slot extending inwardly from said arcuate surface to receive the web of the brake shoe to be relined, insulated heating elements disposed adjacent said arcuate surface and completely encased by the metal of the anvil, releasable means for electrically connecting the heating elements of each anvil with the respective electrical outlet in the base, each anvil having a plurality of unequally spaced pairs of holes formed therein, dowel pins positionable in pairs in said holes to maintain the brake shoe in position on the anvil and the lining in proper relation to the brake shoe, clamping means including a flexible metallic clamping strap resiliently anchored to each anvil at one end and adapted to overlie the brake shoe and lining thereon and urge the same into intimate engagement with each other and with their respective anvil, toggle means mounted on each anvil and engageable with the free end of the strap on each anvil to releasably hold the same during bonding, and in circuit with the heating elements of the respective anvil for controlling the temperature of each anvil.

JOHN L. DAVIS.

REFERENCES CITED

The following references are of record in the file of this patent:

UNITED STATES PATENTS

| Number | Name | Date |
|---|---|---|
| 2,489,496 | O'Brien | Nov. 29, 1949 |